United States Patent
Leiderfarb et al.

(10) Patent No.: US 10,511,616 B2
(45) Date of Patent: *Dec. 17, 2019

(54) METHOD AND SYSTEM FOR DETECTING AND REMEDIATING POLYMORPHIC ATTACKS ACROSS AN ENTERPRISE

(71) Applicant: CHECKPOINT SOFTWARE TECHNOLOGIES LTD., Tel Aviv (IL)

(72) Inventors: Tamara Leiderfarb, Modi'in (IL); Lior Arzi, Givatayim (IL); Anandabrata Pal, Rehovot (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,377

(22) Filed: Nov. 6, 2018

(65) Prior Publication Data

US 2019/0075125 A1    Mar. 7, 2019

Related U.S. Application Data

(63) Continuation of application No. 15/373,482, filed on Dec. 9, 2016, now Pat. No. 10,193,906.

(60) Provisional application No. 62/264,890, filed on Dec. 9, 2015.

(51) Int. Cl.
*H04L 29/06*    (2006.01)

(52) U.S. Cl.
CPC ........ *H04L 63/1416* (2013.01); *H04L 63/145* (2013.01); *H04L 63/1441* (2013.01)

(58) Field of Classification Search
CPC ............ H04L 63/1426; H04L 63/1441; H04L 63/145; H04N 21/4665
See application file for complete search history.

(56) References Cited

U.S. PATENT DOCUMENTS

| | | | |
|---|---|---|---|
| 7,203,963 B1 * | 4/2007 | Wu | G06F 21/552 709/224 |
| 8,997,227 B1 * | 3/2015 | Mhatre | H04L 63/1416 726/23 |
| 2003/0004688 A1 * | 1/2003 | Gupta | G06F 21/55 702/188 |
| 2005/0138413 A1 * | 6/2005 | Lippmann | G06F 21/577 726/4 |
| 2006/0021050 A1 * | 1/2006 | Cook | G06F 21/577 726/25 |
| 2010/0082513 A1 * | 4/2010 | Liu | H04L 63/1458 706/46 |

(Continued)

OTHER PUBLICATIONS

Pudar (PENET: A practical method and tool for integrated modeling of security attacks and countermeasures, computers & security 28 (2009), pp. 754-771) (Year: 2009).*

*Primary Examiner* — Sher A Khan
(74) *Attorney, Agent, or Firm* — Mark M. Friedman

(57) ABSTRACT

Disclosed are methods and systems for detecting malware and potential malware based on using generalized attack trees (generalized attack tree graphs). The generalized attack trees are based on attack trees (attack tree graphs), whose objects, such as links and vertices, have been analyzed, and some of these objects have been generalized, resulting in the generalized attack tree of the invention.

9 Claims, 14 Drawing Sheets

(56) References Cited

U.S. PATENT DOCUMENTS

| | | | |
|---|---|---|---|
| 2010/0333002 A1* | 12/2010 | Karabey | G06Q 10/10 715/764 |
| 2012/0096551 A1* | 4/2012 | Lee | G06F 21/55 726/23 |
| 2012/0174227 A1* | 7/2012 | Mashevsky | G06F 21/562 726/24 |
| 2014/0082730 A1* | 3/2014 | Vashist | H04L 63/1416 726/23 |
| 2016/0099953 A1* | 4/2016 | Hebert | H04L 63/1416 726/23 |
| 2016/0239661 A1* | 8/2016 | Kawauchi | G06F 21/55 |
| 2017/0019421 A1* | 1/2017 | Hebert | G06F 16/2246 |

* cited by examiner

Subtree From Tree Tx₁

Subtree From Tree Tx₂

METHOD AND SYSTEM FOR DETECTING AND REMEDIATING POLYMORPHIC ATTACKS ACROSS AN ENTERPRISE

CROSS-REFERENCES TO RELATED APPLICATIONS

This application is a Continuation Patent Application of commonly owned U.S. patent application Ser. No. 15/373,482, entitled: Method and System for Detecting and Remediating Polymorphic Attacks Across an Enterprise, filed on Dec. 9, 2016, now, U.S. Pat. No. 10,193,906, which is related to and claims priority from commonly owned U.S. Provisional Patent Application Ser. No. 62/264,890, entitled: Method and System for Detecting and Remediating Polymorphic Attacks Across an Enterprise, filed on Dec. 9, 2015, the disclosures of both of the aforementioned patent applications are incorporated by reference in their entireties herein.

TECHNICAL FIELD

The present invention relates to methods and systems for detecting potential malware.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Polymorphic Attacks

Metamorphic and polymorphic malware are two categories of malicious software programs (malware) that have the ability to change their form (morph) as they propagate. Metamorphic malware is rewritten with each iteration so that each succeeding version of the code is different from the preceding one.

Polymorphic malware is harmful, destructive or intrusive computer software such as a virus, worm, Trojan or spyware that constantly changes ("morphs"), making it difficult to detect with anti-malware programs. Evolution of the malicious code can occur in a variety of ways such as filename changes, compression, encryption with variable keys, and string changes, etc.

Although the appearance of the code in polymorphic malware varies with each "mutation," the essential function usually remains the same. For example, a spyware program intended to act as a keylogger will continue to perform that function even though its signature changes. If the malicious program is discovered by an anti-malware vendor and its signature is added to a downloadable database, the anti-malware program will fail to detect the rogue code after the signature has changed, just as if a new virus, worm, Trojan or spyware program has emerged. In this way, malware creators gain an advantage over countermeasure developers

SUMMARY OF THE INVENTION

Embodiments of the invention are directed to a method for detecting potential malware. The method comprises: obtaining an attack tree representative of an attack on a network, the attack tree formed of objects; analyzing the objects to determine whether each of the objects is classified as known or unknown, in accordance with predefined criteria; and, representing the unknown objects in the attack tree as generalized, resulting in the creation of a generalized attack tree from the obtained attack tree.

Optionally, the objects include links and vertices.

Optionally, the links are determined to be known.

Optionally, an object is determined as unknown when: a) the object is unknown in accordance with predetermined criteria; or, b) the object is known and malicious in accordance with predetermined criteria.

Optionally, the attack on the network occurs in at least one machine linked to the network.

Optionally, the attack on the network occurs at an endpoint of the network.

Embodiments of the invention are directed to a computer usable non-transitory storage medium having a computer program embodied thereon for causing a suitable programmed system to detect potential malware, by performing the following steps when such program is executed on the system. The steps comprise: obtaining an attack tree representative of an attack on a network, the attack tree formed of objects; analyzing the objects to determine whether each of the objects is classified as known or unknown, in accordance with predefined criteria; and, representing the unknown objects in the attack tree as generalized, resulting in the creation of a generalized attack tree from the obtained attack tree.

Optionally, the computer usable non-transitory storage medium is such that the objects include links and vertices.

Optionally, the computer usable non-transitory storage medium is such that the links are determined to be known.

Optionally, the computer usable non-transitory storage medium is such that an object is determined as unknown when: a) the object is unknown in accordance with predetermined criteria; or, b) the object is known and malicious in accordance with predetermined criteria.

Embodiments of the invention are directed to a method for detecting potential malware. The method comprises: a) obtaining a first generalized attack tree; b) breaking the first generalized attack tree into subtrees; c) obtaining at least one subtree associated with a subsequent generalized attack tree; d) comparing the subtrees from the first generalized attack tree to the subtrees associated with the subsequent generalized attack tree, based on the generalized objects; and, e) creating an updated generalized attack tree from the subtrees from the first generalized attack tree and the subtrees associated with the subsequent generalized attack tree. Optionally, the method additionally comprises: f) obtaining the subtrees associated with updated generalized attack tree; g) comparing the subtrees associated with the updated generalized attack tree with subtrees associated with a subsequent generalized attack tree, based on the generalized objects; and, h) creating an updated generalized attack tree from the subtrees from the previously updated generalized attack tree and the subtrees associated with the subsequent generalized attack tree.

This document references terms that are used consistently or interchangeably herein. These terms, including variations thereof, are as follows.

A uniform resource locator (URL) is the unique address for a file, such as a web site or a web page, that is accessible over Networks including the Internet.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

A "client" is an application that runs on a computer, workstation or the like and relies on a server to perform some of its operations or functionality.

"n" and "nth" refer to the last member of a varying or potentially infinite series.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 9B-1 is an illustration of subtree analysis, performed by the process of FIG. 8A; and, FIG. 9B-2 is an illustration of an attack tree made by combining two attack trees in accordance with the process of FIG. 8A.

DETAILED DESCRIPTION OF THE DRAWINGS

Figure 1:
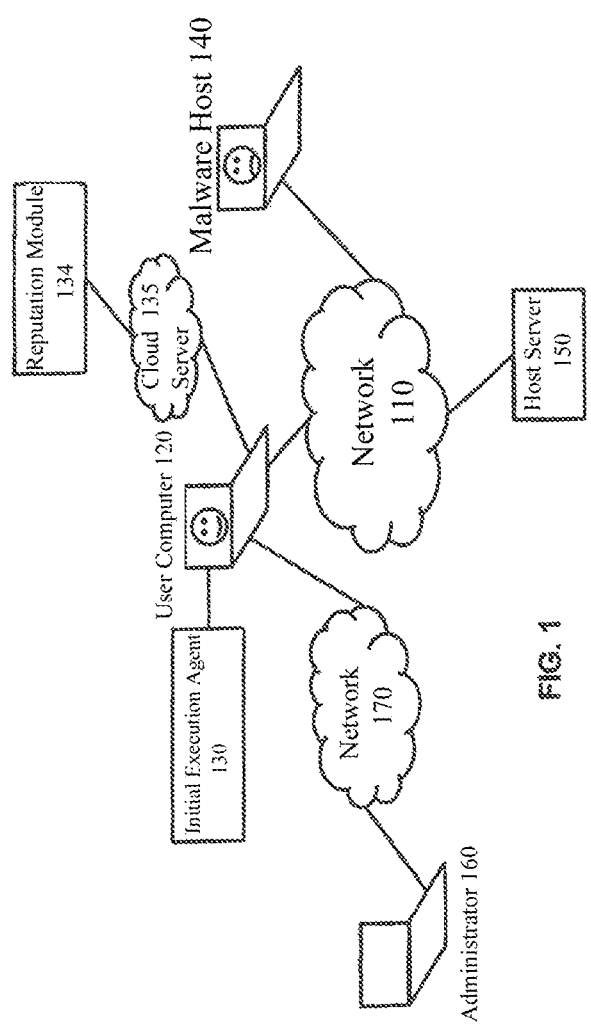
FIG. 1 is a diagram illustrating a system environment in which an embodiment of the invention is deployed.

The present invention provides methods and systems for analyzing attack trees or attack tree graphs, as created, for example in commonly owned U.S. patent application Ser. Nos. 1) U.S. patent application Ser. No. 14/963,267, entitled: Method and System for Modeling All Operations and Executions of an Attack and Malicious Process Entry, filed on Dec. 9, 2015, 2) U.S. patent application Ser. No. 14/963,265, entitled: Method and System for Determining Initial Execution of an Attack, filed Dec. 9, 2015, 3) U.S. Provisional Patent Application Ser. No. 62/264,881, entitled: Method and System for Identifying Potentially Malicious Events During an Attack, filed on Dec. 9, 2015, and 4) U.S. patent application Ser. No. 15/292,169, entitled: Method and System for Identifying Uncorrelated Suspicious Events During an Attack, filed on Oct. 13, 2016, the disclosures of which are incorporated by reference in their entirety herein. These attack trees graphically show attacks on endpoints of networks, systems and the like, through a series of objects, such as vertices connected by links, the vertices and links themselves being objects.

As malware tends to be polymorphic, the methods and systems of the present invention treat the objects, for example, the vertices between links in the attack tree graph, to be indicative of malware, and classified as "unknown". Other objects in the attack tree graph remain classified as "known". These "unknown" objects are generalized, in accordance with processes of the invention, and a generalized attack tree (attack tree graph) is created from the initial attack tree (attack tree graph), where these "unknown" objects have been generalized, and are represented as such in the generalized attack tree. By generalizing these "unknown" objects, and creating the generalized attack tree therefrom, malware is accurately identified, allowing for high probabilities of finding other instances of this same malware in other attack trees.

Moreover, as malware is multistage, the generalized attack trees of the present invention, allow for the detection of malware, based on historical executions of the malware, from the first instance of its execution.

Upon the detection of an attack (i.e., malicious attack) on a user computer, such as, for example, an endpoint client, a graphical model of the attack can be generated by an agent installed on the user computer (or on an administrator computer linked to the user computer). In a preferred but non-limiting implementation, a virtual attack tree is generated as the graphical model representative of such an attack.

The methodology of the construction of such a tree based model is disclosed in the applicants' commonly owned U.S. patent application Ser. No. 14/963,267, entitled: Method and System for Modeling All Operations and Executions of an Attack and Malicious Process Entry, filed on Dec. 9, 2015, the disclosure of which is incorporated by reference in its entirety herein.

The above algorithm's output is in the form of a tree. The tree depicts the execution (i.e., call) of the attack on the detected computer. The vertices (nodes) of the tree represent the artifacts or objects (the terms artifacts, objects and nodes are used interchangeably herein, with vertices and links being types of artifacts, objects and nodes) created and/or executed, either directly or indirectly, as well as any files created or accessed by any of the above mentioned processes, for example, a Process, a file, a URL, and a Registry Key The links between the vertices represent the actual action that was done by/to the vertice (object or artifact) by its neighbor vertices (object or artifact), which include, for example:

File creations
File Writes
File Reads
File Deletes
File accesses
Http Get
Http Post
Kernel Object Created
Kernel Object Acquired
Process injected
Hook Installed
Hook Accessed
Registry Key created
Registry key changed
Registry key Read
Process direct execution
Process indirect execution As a result, the virtual attack tree depicts a model of the attack in a specific computer, including all the artifacts involved and how they affect the system.

Following the above discussed event analyzing algorithms together with the nature of the data being constantly recorded, the amount of information gained about the specific attack is at the same time much more accurate and noise free than any other conventional detection system. Noise in this case means the benign or unrelated artifacts that are not related to the attack, but do take part in it. Lack of noise increases the confidence of related artifacts and enables this detection system to provide automatic remediation tools that do not require human interaction, without extra risk of damaging the system, when there are deleting/reverting malware activities.

Typically, the user computer is linked to other computers over a network, such as, for example, the Internet, an Intranet, cellular networks, wide area, public, and local networks. Accordingly, by sharing the knowledge gained from a specific attack on a specific computer with other computers on the network (i.e., elements of the enterprise or in the wild) enables early detection, and remediation before the malware manages to perform malicious activity.

The sharing of the knowledge may be accomplished by uploading the nominated attack tree graph, as created by the process disclosed herein to a central management console or server that is linked to the network and is accessible by all computers on the network, or by directly transmitting (or otherwise communicating) it to computers on the network.

However, in contemporary attacks (the most common), many of the artifacts participating in the attack are polymorphic:

Artifact (or object) names (usually file names, file paths, registry keys, global object names, like mutexes or pipes, URLs, IP (internet Protocol) addresses) are randomized by the malware authors. This means that they will be different in any other instance of the attack.

Binary form: Calculating hashes of the binary is one of the most common methods of malware detection. Malware is aware of this and therefore modern malware will make sure that different attack instances present different binary hashes (md5/sha1/sha2/sha256).

Behavioral model: Malwares can change their behavior according to the system in which they are they are acting in, the installed software versions, the type of processor, etc., or just change some of its behaviors in different instances to avoid regular behavioral detection.

Accordingly, the present invention allows for the detection or prevention attacks in other systems, by looking for sequence of actions and the relations between each other that look like the presently existing normalized sequence of attacks.

In the context of this document, the term data object/object/artifact/node/vertice generally refers to files, registry keys, network operations, file modifications, registry entries, injections, mutexes, pipes, hooks, and application arguments.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, references are made to trademarks, and domain names. These trademarks and domain names are the property of their respective owners, and are referenced only for explanation purposes herein.

FIG. 1 shows an example environment in which embodiments of the present disclosure are performed over a network 110. The network 110 may be formed of one or more networks, including, for example, the Internet, cellular networks, wide area, public, and local networks. The embodiments include a system 120' (FIG. 2), including, for example, an agent 130, on an endpoint client, for example, a user computer 120 (linked to the network 110). The agent 130 determines the initial execution of an attack (i.e., malware attack) on the user computer 120. Based on this initial execution of an attack, the entry point of the attack can be determined (by the entry point determination module 138) and the attack can be modeled, for example, in the form of an attack tree, by the attack modeling module 139, as shown in FIG. 2.

In a non-limiting example, a malware host 140, also linked to the network 110, creates a malicious file that when executed calls a process that may be a malicious process or a benign process. The malicious file is made available to the host server 150 by the malware host 140. The host server 150 is linked to the network 110 and represents numerous servers hosting, for example, web sites, accessible through web servers (not shown). The malicious file enters the user computer 120 via the access of the host server 150 by the user computer 120.

The agent 130 includes software, software routines, code, code segments and the like, embodied, for example, in computer components, modules and the like, that are installed on machines, such as the user computer 120. For example, the agent 130 performs an action when a specified event occurs, as will be further detailed below. The agent 130 may be instructed to perform such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
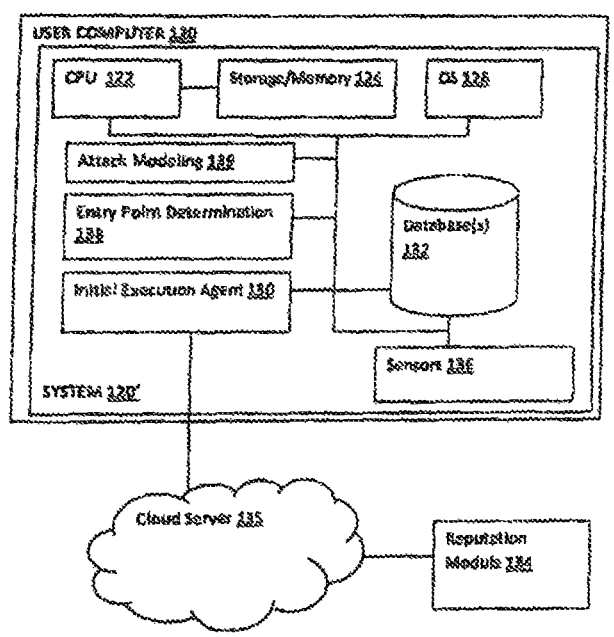
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as "the system" in the descriptions of FIGS. 3-6 below. All components of the user computer 120 and/or system 120' are connected or linked to each other (electronically and/or data), either directly or indirectly.

Initially, the user computer 120 (and system 120') includes a central processing unit (CPU) 122, a storage/memory 124, and an operating system (OS) 126. The processors of the CPU 122 and the storage/memory 124, although shown as a single component for representative purposes, may be multiple components.

Figure 4A:
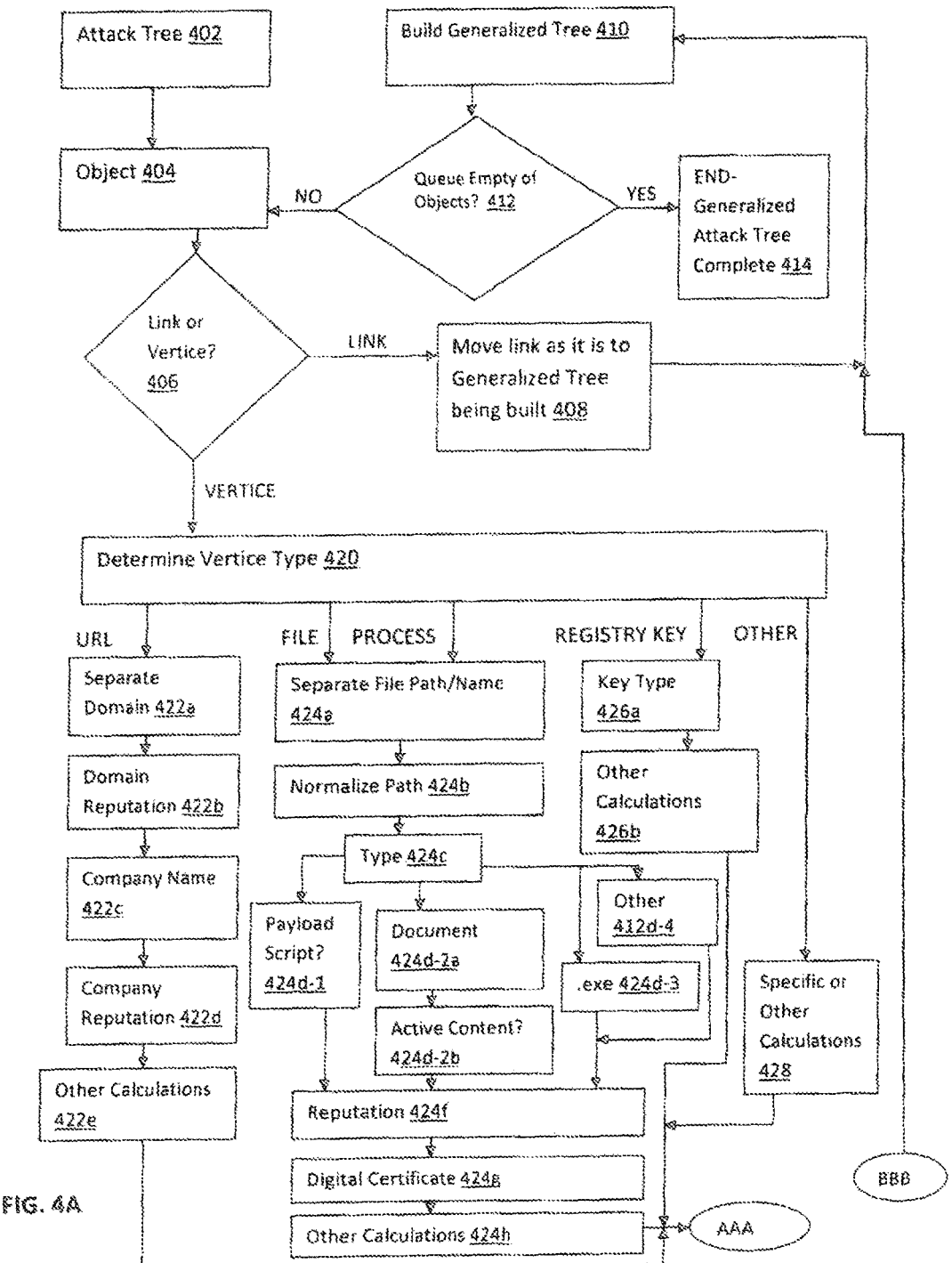
FIGS. 4A and 4B area flow diagram illustrating a process to identify objects from an attack tree and determine whether to generalize them in a generalized tree (or graph), corresponding to the attack tree of FIG. 3.
Figure 4B:
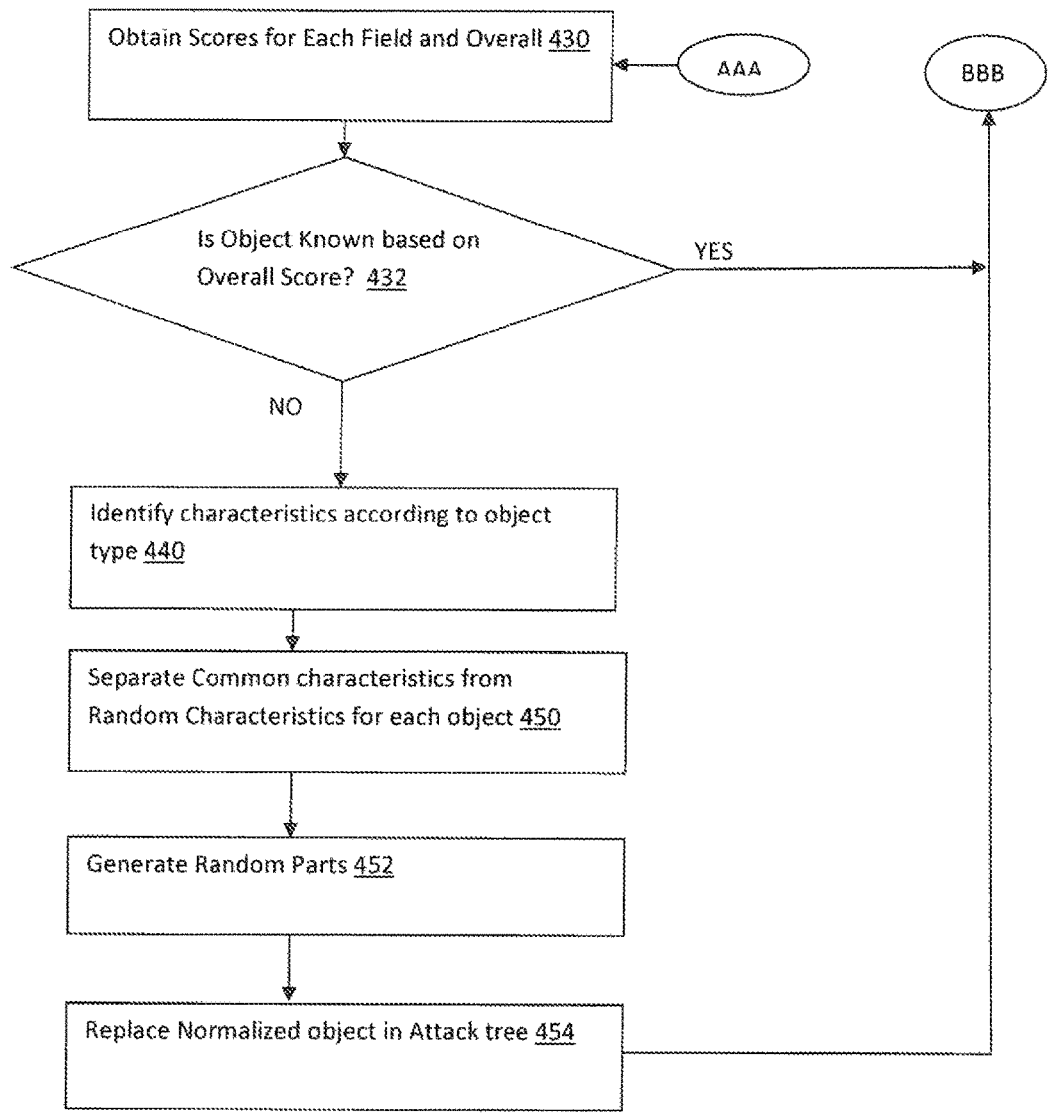

The CPU 122 is formed of one or more processors, including microprocessors, for performing the user computer 120 functions, including executing the functionalities and operations of the agent 130, as detailed herein, the OS 126, and including the processes shown and described in the flow diagrams of FIGS. 4A and 4B. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIGS. 4A and 4B, detailed herein.

The OS 126 includes any of the conventional computer operating systems, such as those available from Microsoft of Redmond Wash., commercially available as Windows® OS, such as Windows® XP, Windows® 7, MAC OS from Apple of Cupertino, Calif., or Linux.

Activity that occurs on the user computer 120 is sensed by a sensor or sensors 136. In particular, the sensors 136 are configured to sense changes that occur on the user computer 120. Examples of activity sensed by the sensors 136 includes, but is not limited to file accesses, network accesses, application accesses, registry accesses, file creations, file modifications, process injections, process calls and process creations. The activity sensed by the sensors 136 is written to (i.e., stored in) an activity log which can be maintained in a structured format, such as, for example, a database(s) 132, accessible by the agent 130, entry point determination module 138 and attack modeling module 139.

The database 132 may be installed with the system 120', or may be provided on a remote server, such as, for example, a cloud server 135 (and remain part of the system 120'). Accordingly, the activity log (stored in the database 132) includes a listing of the executions and creations of the processes, also known as "application processes", and data objects on the user computer 120. The activity log may be programmed or otherwise configured to retain the above mentioned information for blocks of time, for example, weeks, months and years. The activity log may also be programmed or otherwise configured to overwrite information pertaining to older activity with information pertaining to recent activity. As such, the activity log retains information for a sliding window of time. Other database(s) 132 include those associated with stacks, queues, and lists, e.g., file and URL/IP lists, respectively, and detailed below.

The agent 130 makes determinations regarding processes, also known herein as "application processes", executed on the user computer 120 based on the reputations of the processes called, and by extension, the reputations of files that when accessed or opened result in the execution of processes. The reputations of the above mentioned processes and files are provided to the agent 130 by a reputation service in the form of a reputation module 134. The reputation module 134 is typically provided on a remote server, such as, for example, a cloud server 135, that is accessible by the agent 130. Alternatively, the reputation module 134 may be installed on the user computer 120 as part of an anti-malware software suite such as, for example, Microsoft® Security Essentials, Norton® anti-virus, and McAfee® anti-virus. Note that the reputation module 134 may also be installed as part of the agent 130. Accordingly, the agent 130 may be configured to perform processes (not shown) for classifying processes and files into the three above mentioned categories.

The reputation module 134 analyzes the files accessed and the processes executed on the user computer 120, either instantaneously or over a period of time. As a result, the reputation module 134, which may also link to a reputation service, is able to classify all application processes executed on the user computer 120 into three categories: malicious processes, unknown processes, and non-malicious processes (i.e., good processes). As an example, processes run from payload applications, for example, MS Word®, MS Excel®, are typically classified as non-malicious processes. The process called by the execution of the Windows® OS executable file sdbinst.exe is also an example of a non-malicious process.

The reputation module 134, regardless of its location, may also be part of the system 120'.

An entry point determination module 138 performs processes such as those shown in FIGS. 4A and 4B and detailed below, for determining the point (location) where the malicious or suspicious process entered the endpoint, for example, the user computer 120, system 120', network (e.g., network node) or the like, and may be based on the initial execution of the attack, e.g., the attack root of the malicious process or a suspicious process, the attack root described, for example, in commonly owned U.S. patent application Ser.

No. 14/963,267, entitled: Method and System for Modeling All Operations and Executions of an Attack and Malicious Process Entry.

An attack modeling module 139 allows for an attack tree to be created and plotted (diagrammed), based on, for example, the entry point of the malicious or suspicious process, at the requisite endpoint.

Figure 3:
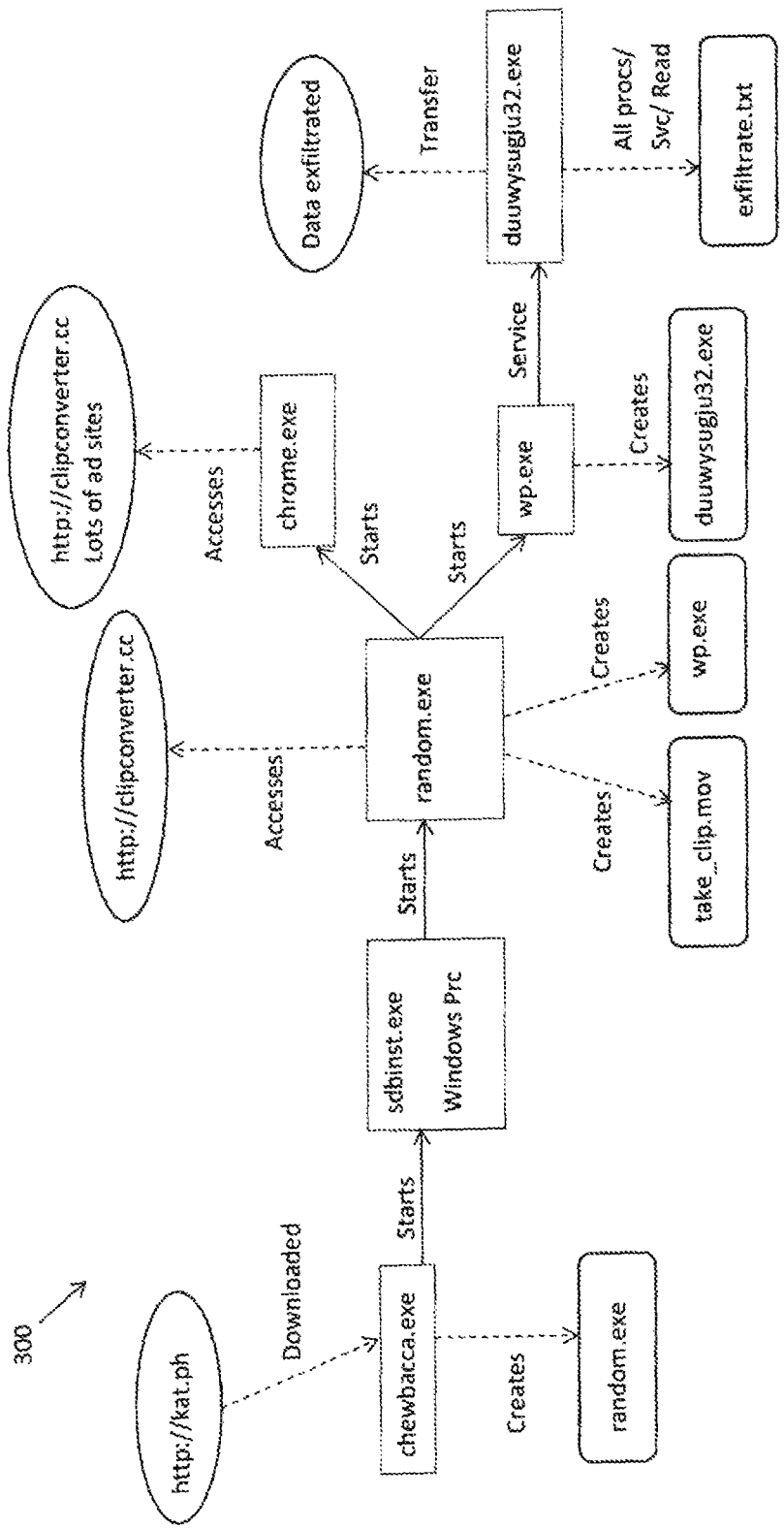
FIG. 3 is a diagram of an example of a malicious attack in the form of an attack tree.

To better understand the operation of the components, including the agent 130 and all instructions for executing the processes of FIGS. 4A and 4B, FIG. 3 shows a diagram of an example malicious attack 300 on an enterprise, which is detected and remediated by the system 120' in accordance with the invention.

In the example malicious attack, the OS 126 of the user computer 120 is a Windows® OS. The attack 300, illustrated in FIG. 3 depicts paths that include creations of files and data objects (exemplified by broken line arrows), execution events in which a process (application process) executes (i.e., calls) another process (application process) and accesses, such as, for example, downloads, uploads, data transfers, and, file transfers, and the like. Additional paths in alternative example of attacks, including malicious attacks, may be depicted to show network operations, file modifications, registry entries, injections, mutexes, pipes, hooks, and application arguments.

In FIG. 3, the attack tree is formed of various artifacts (objects), some of which are benign processes, while other artifacts are installed by the attack itself. Initially, the computer user's browser is directed to the URL http://kat.ph. The executable process chewbaca.exe is downloaded to the user's computer. The execution of the process chewbaca.exe causes the creation of the file random.exe and starts the process sdbinst.exe. The process sdbinst.exe is a Windows® process (Windows® is from Microsoft, Inc. of Redmond Wash., USA), and is, for example a benign Windows® process.

Building Generalized Attack Trees

The process sdbinst.exe starts the process random.exe. The random.exe process executes, causing the URL http://clipconverter.cc to be rendered to the browser of the user computer, and creates two files: 1) fake_clip.mov, and, 2) wp.exe. The random.exe process also starts the process chrome.exe and wp.exe.

The now executing chrome.exe process causes the browser of the user computer to direct to the URL http://clipconverter.cc, where multiple ad clips are rendered to the user's browser. With the process wp.exe now executing, it creates the process duuwysyju32.exe. The wp.exe has created a service to execute the duuwysyju32.exe process.

The duuwysyju32.exe reads the file exfiltrate.txt and transfers data by exfiltration to a destination outside of the enterprise network, such as a destination along the world wide web (WWW).

FIGS. 4A and 4B are a flow diagram of a process used to evaluate attacks, for example, the attack 300 of FIG. 3. The process is in two phases, a first phase to determine whether to generalize a vertice, from blocks 402-432, and a second phase of how to generalize each vertice selected for generalization from the first phase, at blocks 440-454.

Figure 6:
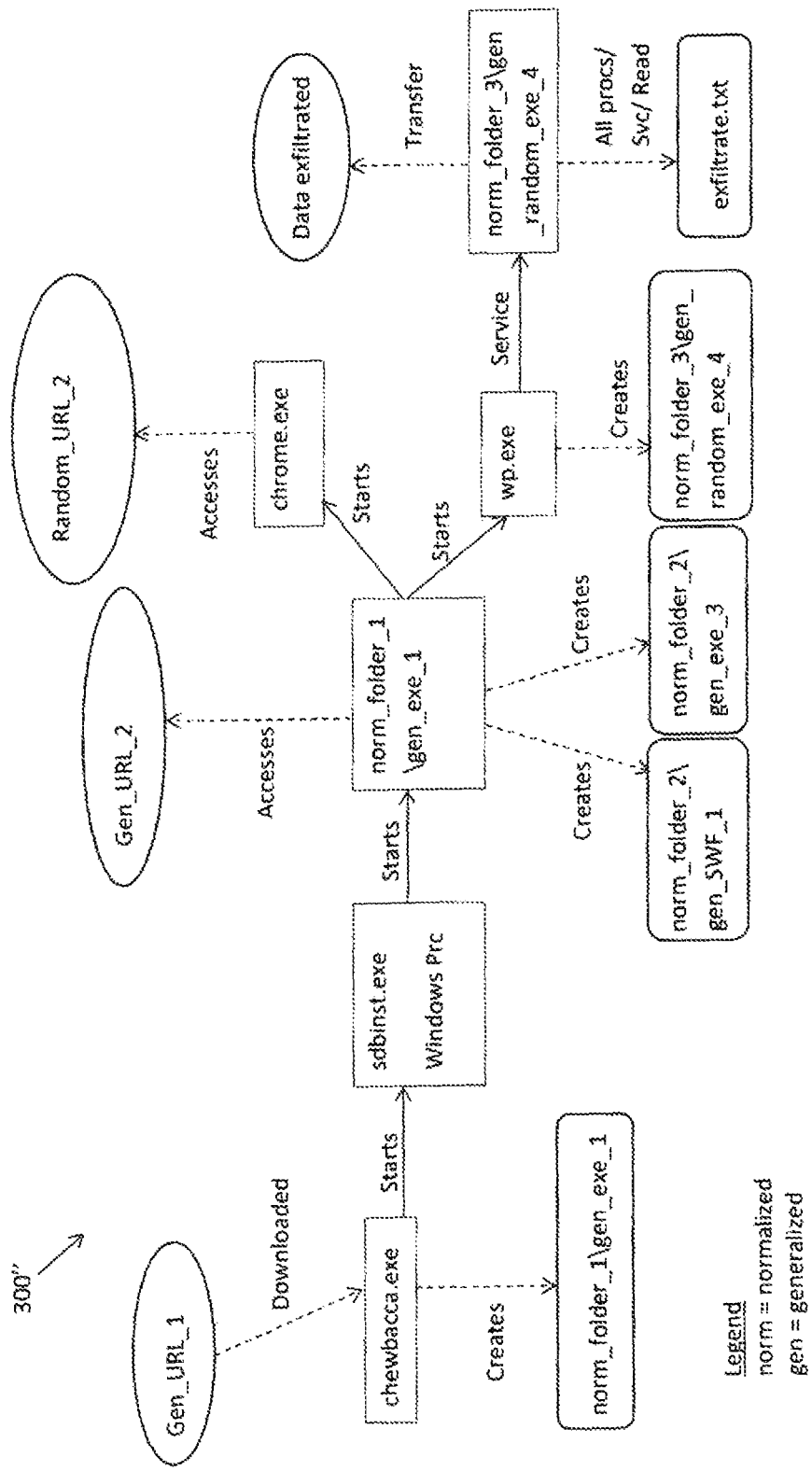
FIG. 6 is a normalized tree (graph) based on the generalized tree (graph) of FIG. 5.

The process begins at block 402, where an attack tree 300, such as that of FIG. 3, is generalized (continuing through block 454), resulting in a generalized attack tree or graph 300', and, for example, normalized (a normalized attack tree or graph 300"), as shown in FIG. 6. At block 402, all objects of the attack tree (graph), for example, links and vertices, are placed into a queue (e.g., storage media), and these objects are subsequently removed or "popped" from the queue, for example, one at a time, at block 404. The process moves to block 406, where it is determined whether the object is a link or vertice. A link is represented by an arrow between blocks or vertices. If a link, at block 406, the link is kept as it is, and moved to the generalized tree being built, at block 408. This follows the assumption that in an attack tree, links are not polymorphic.

From block 408, the process moves to block 410, where the link is placed into a generalized tree being built. From block 410, the process moves to block 412, where it is determined whether the queue is empty of objects. Should the queue be empty of objects, the process moves to block 414, where the process ends, as a generalized attack tree has now been built (is complete). Should the queue not be empty of objects, the process moves to block 404, from where it resumes, as the next object is removed, or "popped" from the queue for analysis by the process of the invention.

Returning to block 406, should the object be a vertice, the process moves to block 420. At block 420, the object type is selected. This object type includes a URL, a file, a process, a registry key, or other object (which is defined by the system and can change over time, including adding to or subtracting from a list of other objects). From block 420, the process will move the block 430, depending on the various object types.

Each object type will be analyzed, resulting in a field score for each test/analysis, as performed in each block (or group of blocks where indicated) of the 422, 424, 426 and 428 series of blocks. For example, the field score may be rendered as "known" or "unknown", with criteria such that "known" means known and not malicious, with "unknown" meaning either: 1) known and malicious, or 2) unknown. The criteria for "known" and "unknown" is, for example, set by the system or by a system administrator, programmed into the system, or the like. A field score can be for example, a binary "1" or "0". For example, a field score for a test/analysis which results in an item/object/artifact which is "known", and may have a score of "1", while a field score for a test/analysis which results in an item/object/artifact with is "unknown" may have a score of "0". Alternately, the binary scores of "1" and "0" can be replaced with regular and/or weighted numeric scores. Also, not every object type has to be subjected to every analysis in the 422, 424, 426 and 428 series, should that aspect of the object not be present, or the system is not programmed to perform that specific analysis.

Should the object be a URL, the process moves to blocks of the 422 series. Should the object be a file or process (hereinafter, an application process), the process (the overall process) moves to blocks of the 424 series. Should the object be a Registry Key, the process moves to blocks of the 426 series. Should the object be a an object which is not a URL, File, Application Process, or Registry Key, but defined within the system, the process moves to blocks of the 428 series.

Turning to blocks of the 422 series, for a URL object, the domain is separated from the URL, at block 422a. Next, at block 422b, the domain reputation is analyzed, to provide a field score. This is typically done by using reputation systems that determined the commonality of the domain. Should a domain not be known by reputation sources, this is a strong indicator of polymorphism (although it can be a new version of a known object).

The process moves to block 422c, where the company name is obtained. Moving to block 422d, the company reputation, based on the company name, is evaluated. For example, the company reputation is scored, typically by comparing the company name to predetermined reputation scores for companies in a database or the like. Also, the name of the company associated with the domain, for example, the company signing the object is considered by comparing the object to those of a white list of high reputation companies and their certificates. The company reputation is given a field score. Next, the process moves to block 422e, where, for example, other evaluations, such as the type of web site, web pages associated with this domain, is evaluated, and given a field score. For example, if the type of the web site is news, weather, a store, it will be acceptable, and for example, given a binary "1" or other high score. However, if the type of the web site is gambling, casinos, pharmaceuticals, pornography, it will probably result in an unacceptable score (at block 430), for example, a binary "0" or other low score. From block 422e, the process moves to block 430.

At block 430, the object is found to be known or unknown, based on one or more of its field scores, this sum of the field scores is combined into an overall knowledge score. This overall knowledge score, is, for example, a binary 1, indicating the object is "known", or a binary "0" indicating "unknown" and it is treated as a polymorphic object trying to avoid detection, meaning that the object is 1) known and malicious, or 2) unknown. The overall score can also be cumulative, either of binary digits or numeric, and in accordance with its position above or below a threshold, as determined by the system, system administrator or the like, results in an overall object score for an object, which is "known" or "unknown".

Returning to block 420, should the object be a file or application process, the overall process moves to blocks 424a-424h. Beginning at block 424a, the path name of the file/application process is separated from the file/application process. Next, at block 424b, the path from block 424a is normalized. Normalizing is done by replacing parts of the path that match windows environmental variables, with the variables themselves quoted. For example, the path a:\users\sally\downloads\file.txt, is replaced by a:\<HOMEPATH*>\downloads\file.txt, as <HOMEPATH*> has replaced users\sally, normalizing the path (a:). The normalization of certain of these objects results in the attack tree 300" of FIG. 6.

Moving to block 424c, the file type, e.g., .doc, executable (.exe) or image (.jpeg, .tiff), is determined At block 424c, the file type is determined according to the file extension and the file content, including "magic bytes" and other calculations, assuming malware may intentionally change the file extension to avoid detection or analysis. Should the file type be one known to carry malware or other threats, or simply be an unknown type, the file will be considered to be unknown, and scored (field score) accordingly. Otherwise, the file will be considered to be known, and scored (field score) accordingly. The process now moves to blocks 424d, formed of blocks 424d-1, when the file type is a payload script, 424d-2a and 424d-2b when the file is a document or .doc, and 424d-3, when the file is an executable, i.e., a .exe file, and 424d-4, where the file type is not a payload script, a document or .exe file. This other file at block 424d-4 may be, for example, a library file, a photograph, or other file type.

A payload script, at block 424d-1 is a script which executes a payload process. A payload process is a process or application which is typically benign, but can execute malicious activity. Some exemplary payload script types include, for example, Java Script, Virtual Basic, and, Power Shell. This payload process script is analyzed and assigned a field score, typically based on criteria programmed into the system.

Turning to blocks 424d-2(a and b), should the file be a document, i.e., .doc, .docx, or the like, at block 424d-2a, the active content is analyzed for a score, at block 424d-2b. The field score is assigned, for example, based on criteria programmed into the system 120'.

At block 424d-3, the file is an executable, i.e., a .exe file, and is evaluated for a score. The field score is assigned, for example, based on criteria programmed into the system.

At block 424d-4, the file in one that is not a payload script, a document or a .exe, but could be, for example, a library file, a picture, or another file. Depending on the score as programmed into the system, this other file type could be considered "known" or "unknown".

From blocks 424d-1, 424d-2b, 424d-3 and 424d-4, the process moves to block 424e, where other tests/analysis are performed, to determine a score. These tests/analysis, include, for example, java script, macros, and the like. The field score is assigned, for example, based on criteria programmed into the system 120'.

Moving to block 424f, the reputation of the file/application process is analyzed. This is typically performed by a reputation service, which indicates the commonality of the file/application process. If the file/application process is common, it is probably going to be scored (field score) as "known", while if the file is not common, it will probably be scored (field score) as "unknown". Also at block 424f, the reputation of the company who created the file is evaluated. Should the company be known and have a good reputation, the score (field score) will be indicated as "known", while if the company reputation is not well known, the reputation will probably be scored (field score) as "unknown".

The process moves to block 424g, where the digital certificate of the file is evaluated. Should the digital certificate be valid or active and signed by a known entity, the score (field score) it is probably going to "known", while if the digital certificate is expired, and/or not signed, and/or signed by an unknown entity, the digital certificate will probably be scored (field score) as "unknown".

The process then moves to block 424h. Here, other tests/analysis are performed on the object, to determine a score. These tests/analysis, include, for example, java script, macros, and the like. The field score is assigned, for example, based on criteria programmed into the system 120'.

From block 424g, the process moves to block 430, where the score based on blocks 424a-424g is determined, as detailed for block 430 above.

Should the object be a process, the evaluation process for this process follows the path of blocks 424a-424c, from block 420 to block 430, as detailed for a file (when the file is the object at block 420) above.

Should the object be a registry key, the process moves from block 420, to block 426a and 426b. At block 426a, the registry key type, e.g., the default value of the key, and given a field score according to system criteria (e.g., as programmed into the system). At block 426b, additional other calculations/analysis, such as, for example, determining the entity who can access the key, are performed.

At block 426b, other calculations to determine a field score, such as one based on the key depth are performed. Key depth is analyzed, by looking at keys, and subsequent sub keys, to determine the subkey depth where the subkey is no longer known, and accordingly, where generalization begins. If the generalization, begins before a threshold (as programmed into the system), the registry key will probably be scored as "unknown", while if the generalization begins after a threshold (as programmed into the system), the registry key will probably be scored as "known". This score is finalized at block 430.

Should the registry type be unknown, it is scored (field score) accordingly. Should the registry key type be known, it is scored (field score) accordingly.

Returning to block 420, should the object be an object, which is not a URL, file, application process, or registry key, the object is classified as "other". The process moves to block 428, where a specific calculation is made, as programmed into the system, to evaluate the other object. For example, should the object be a mutex, the name is evaluated. Should the name be known, the score (field score), at block 428 will be indicative of "known". Otherwise, should the name be known and malicious, or unknown, the score, at block 428, will be indicative of unknown. Also for example, should the object be a pipe, the port or target application associated therewith is evaluated, to determine the score (field score), at block 428. As the system becomes aware of still other objects, the system can be programmed to evaluate these other objects at block 428. The field scores at block 428 become the overall object scores at block 430.

At block 430, with the scores assigned, both for each field and overall, for each type, the process moves to block 432, where the overall score, based on the relevant field scores, is correlated with the object being known or unknown. Should the overall score be indicative of the object being known, the process moves to block 410, where the object (i.e., vertice) is pushed to the generalized tree being built, with the object added to the generalized tree being built at block 410. The process then resumes from block 410, as detailed herein.

Returning to block 432, should the overall score be indicative as unknown, the process moves to block 440. With the object now considered to be unknown, it is treated as a polymorphic object trying to avoid detection, for example, as mentioned above. The object is generalized in such a way that it is accurately represented though lowering the inherit risk of making damage by over-generalization.

At block 440, the object type is again identified. The process moves to block 450, where for each identified object type, constant parts or characteristics are separated from random parts or characteristics.

The process then moves to block 452, where random parts are generated, so as to be generalized. When one or more features for each object type are generalized, they are, for example, generalized to a regular expression. A regular expression is a sequence of characters that define a string pattern.

For each object type, there is provided a list of features which can be generalized. This list may be continuously updated by system administrators, and the like, and is exemplary. For example, with objects that are URLs, the parts can be generalized include, for example, the domain, the path, the type (html/php/js) and parameters. For example, for files, features which can be generalized, include, for example, the file path, the file name, the hash, the size, the type, the associated digital signature (including, company, issuer and date the certificate is valid), and the reputation of the file. For example, for an object which is a process, the features detailed above for the file are used. For example, for a registry key object, features which can be generalized include, the main key, sub key chains, the last sub key and the value name and a value. When the last sub key and the value name are generalized, they are generalized to a regular expression.

Also, for example, a URL of znet.com/home/0731 could be generalized by separating the suffix/home/0731 from the prefix znet.com.

Figure 5:
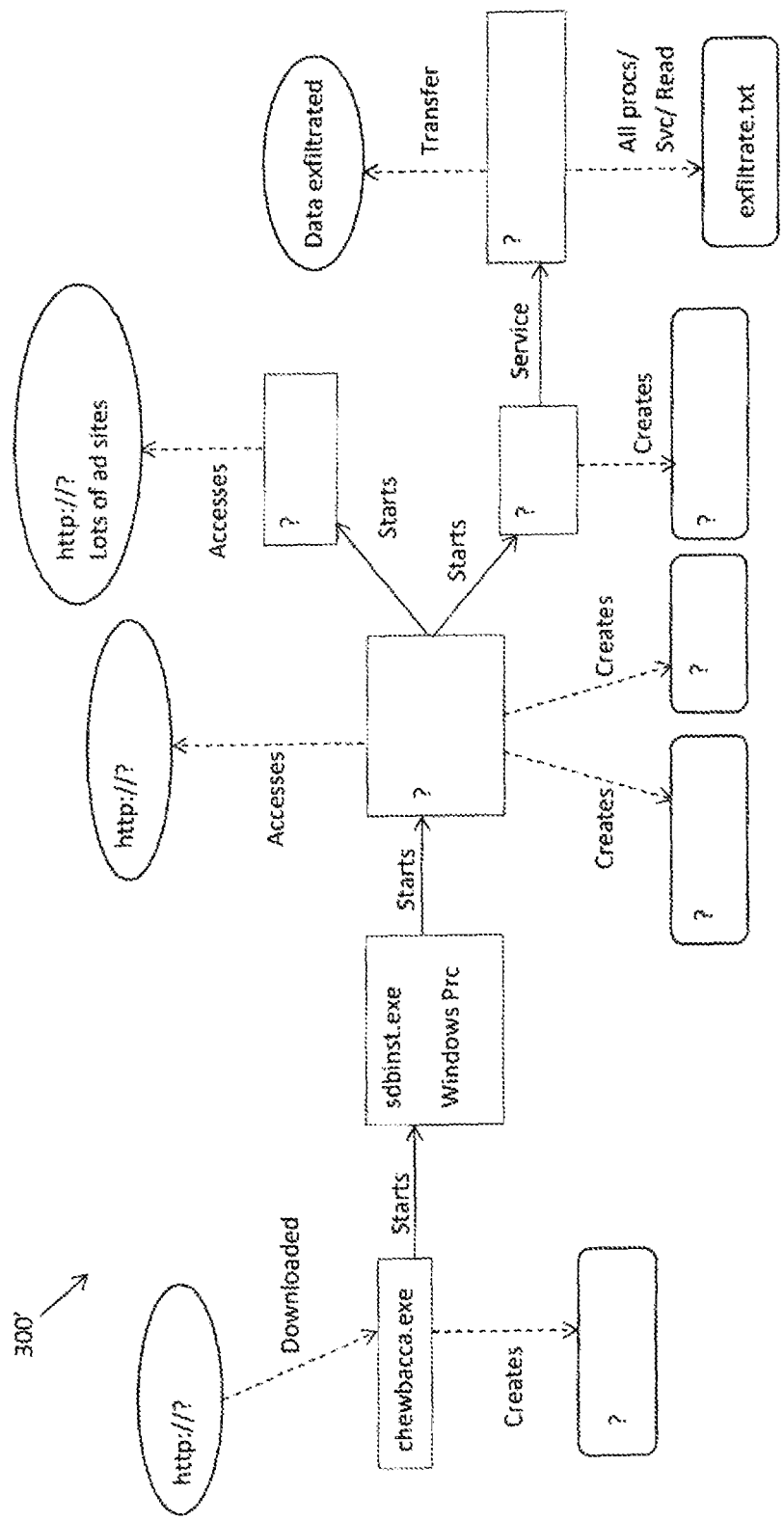
FIG. 5 is a generalized tree (graph), resulting from the process of FIGS. 4A and 4B operating on the attack tree of FIG. 3.

The process then moves to block 454, where the random parts in the respective objects are replaced with generalized objects, e.g., regular expressions, and the object is replaced in the attack tree. For example, objects in the attack tree which have at least some vertices generalized, are represented with question marks "?" in the generalized attack tree 300' of FIG. 5. The "?" indicates all of the objects that were found to be polymorphic, for example, scored by an overall score as "unknown", from the example attack tree 300 depicted in FIG. 3. From block 454, the process moves to block 410, from where it resumes, as detailed above. The generalized attack tree 300' of FIG. 5 is now complete.

FIG. 6 depicts the results of the randomization as would be applied to the example attack shown in FIG. 3. In the example attack, there is an unknown executable norm_folder_1\genExe_1.exe (malware_analisys_viewer. exe), located, which was downloaded from GenURL_1 in the Internet, creating norm_folder_1\gen_Exe_1.exe (random.exe), executing known windows process SdbInst.exe, which norm_folder_1\gen_exe_1.exe, that writes two random files in norm_folder_2/gen_SWF_folder_1 and norm_folder_2Vgen_EXE_3(fake_clip.mov), and norm_folder_3\gen_Random_EXE_4.exe.

In this case, the unknown nodes are left as open to be resolved in the new system, and the known nodes and links in order to understand that:

The machine in question is or is not infected, according to the quantified similarity that can be found in it compared to the original graph (attack tree);

In case the machine is not infected yet, how close it is to being infected, or, in other words, what is the risk level of the machine in question according to how many parts of the attack tree it has in it compared to the original graph. This way attacks are identified in their latent stages, and this knowledge is usable for remediation later on; and, Since the generalized attack tree is taken to be a strong indicator for a specific infection, the type of infection can be determined, and more artifacts are added to the original attack tree.

Method for Augmenting Attacks and Finding Attack Portions on Other Machines

Attention is now directed to FIGS. 7, 8A, 8B, 8C, 9A, 9B-1 and 9B-2, where there are provided methods for identifying attacks and malicious activity. These methods work on the knowledge of malware, for example, changing its behavior in different systems. Although the behavior of the malware changes, a part of the attack by the malware is always present, allowing the system of the invention, in the server 702, to detect an attack.

The system detects the malicious activity of the attack by looking at various attacks, for example, graphed as attack trees and subtrees (a smaller portion of the attack tree, but large enough to not have false positives), as disclosed above. The process of detecting malicious activity is a cumulative process, where newly detected malicious activity, from another attack tree or subtree thereof, is added to the original or present generalized attack tree, continuously augmenting the generalized attack tree with new subtrees to identify attacks and detect locations thereof in which malicious activity is likely to be present.

Figure 7:
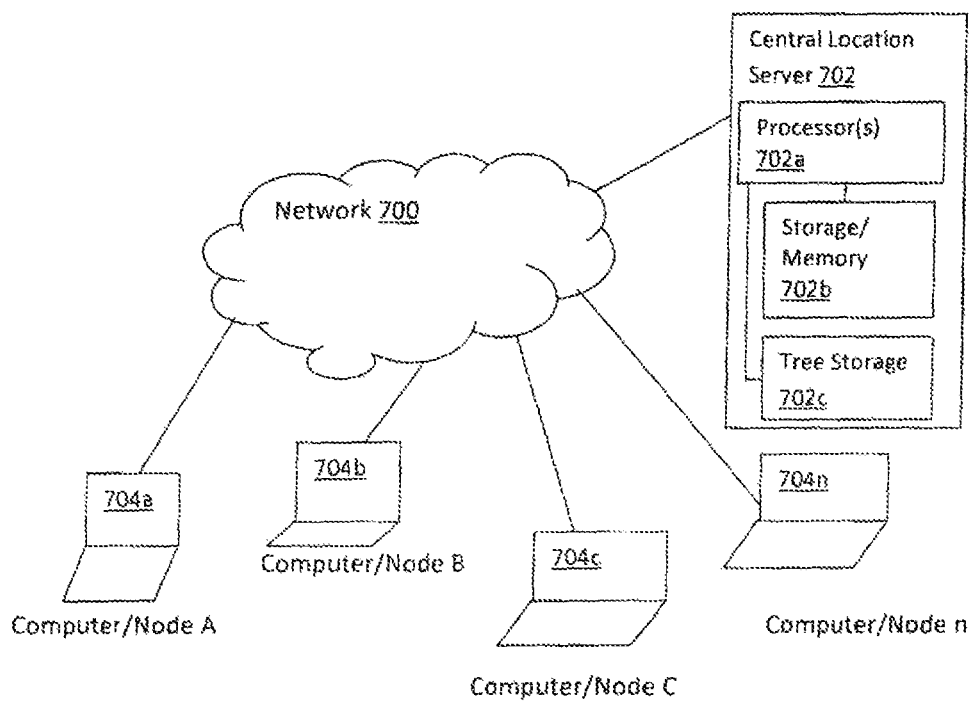
FIG. 7 shows an environment in which a process of the invention for detecting malware and other malicious objects.

FIG. 7 shows an example environment, on which the process of the invention is performed. A network 700, for example, an enterprise network or a public network such as the Internet, is linked to a central location, such as a server 702, representative of one or more servers, machines, computers, and the like. The server 702 is similar to the system 120' detailed above, as it is formed of processors 702a (for example, arranged as part of a central processing unit (CPU) (similar to that detailed above for the system 120') with storage/memory 702b (similar to that detailed above for the system 120') for providing machine readable instructions for the processor, including instructions for performing the computerized processes of FIGS. 8A, 8B and 8C, detailed below. The server 702 also includes storage media, for example, tree storage 702c, for storing attack trees, subtrees and portions thereof, and the aforementioned stored instructions include instructions for processes for generating subtrees from attack trees, as well as processes for locating, comparing and analyzing attack trees, subtrees, and portions thereof. This server 702, or servers, also serves as a central location for receiving attack trees and subtrees, for example, as uploaded, from the computers/nodes 704a-704n (which are similar to the system 120' detailed above), and includes or is associated with storage media for storing the received attack trees and subtrees as well as the attack trees and the cumulative updates of these attack trees, as more malicious activity is determined and found.

Also linked to the network 700 are computers 704a-704n, which are, for example, client computers, representative of users on the network 700. These computers 704a-704n are also referred to as "nodes" and are represented generally as node X. The computers 704a-704n can calculate and generate attack trees and generalized attack trees, as detailed above, as they include systems similar to the system 120' detailed above. "Linked" as used herein includes both wired or wireless links, either direct or indirect, and placing the computers, including, servers, components and the like, in electronic and/or data communications with each other.

The process operates, for example, that once given a malicious vertice is identified in an attack tree, as detailed above, it can be determined that the entire attack tree is malicious, and the machine is infected. This is because in the generalized attack tree, e.g., tree 300', made by processes of the invention as detailed above, there are specific vertices, which are malicious.

Figure 8A:
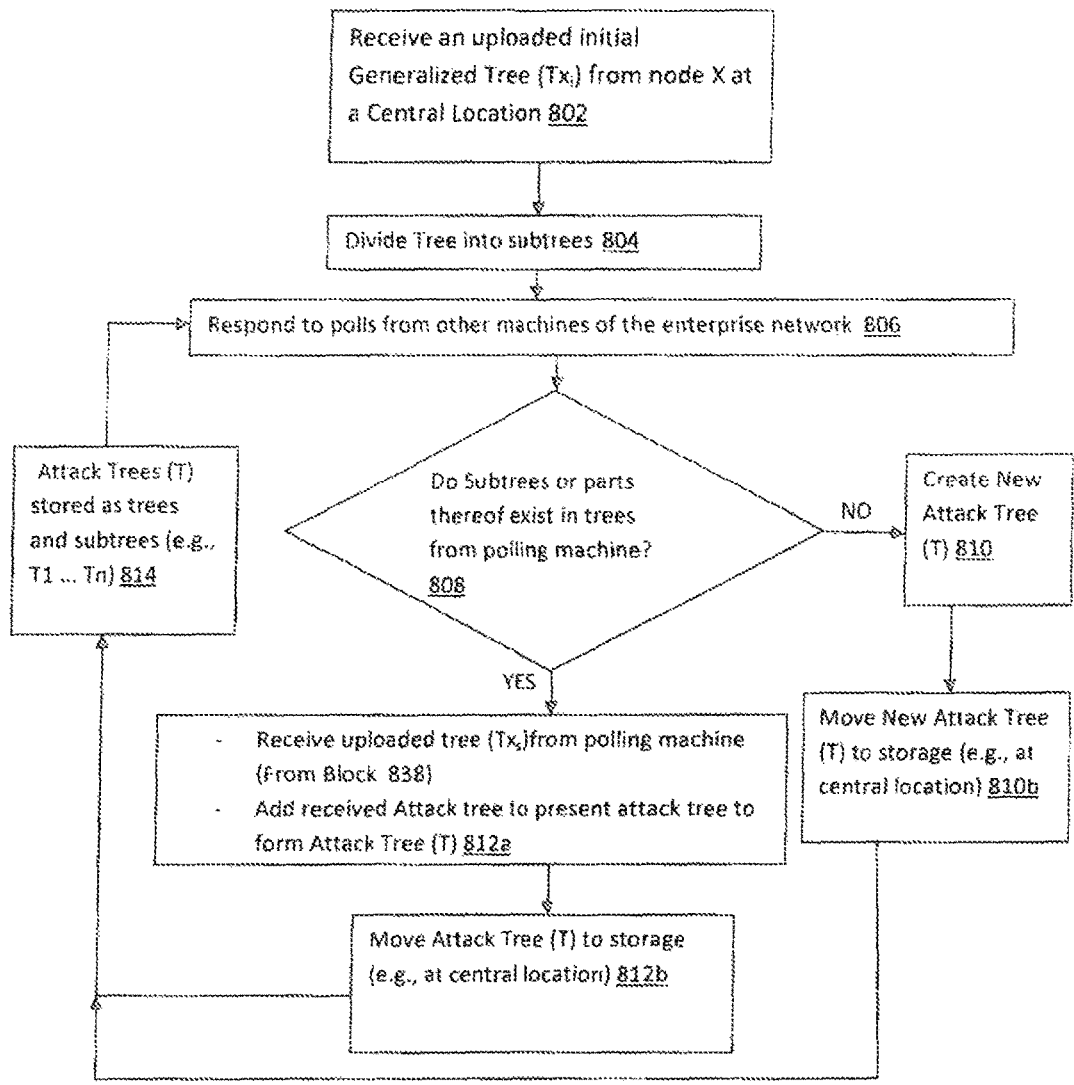
FIG. 8A is a flow diagram of a process performed by a machine in a central location on the enterprise network of FIG. 7.
Figure 8B:
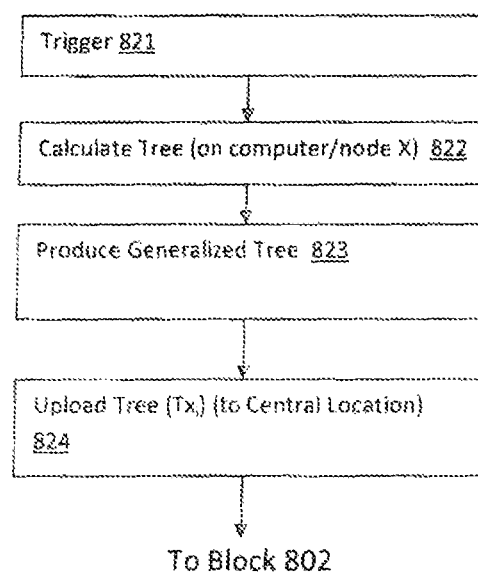
FIG. 8B is a process performed by a machine on the enterprise network of FIG. 7 for the first attack tree to be processed by the machine of the central location.
Figure 8C:
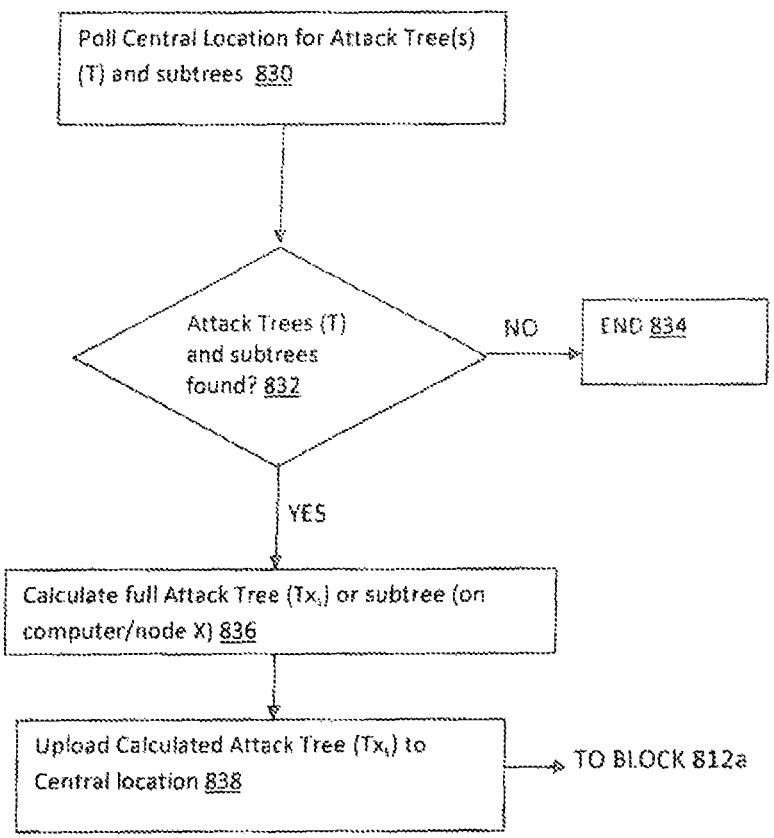
FIG. 8C is a process performed by a machine on the enterprise network for a subsequent attack tree to be processed by the machine of the central location.

FIGS. 8A, 8B and 8C show processes performed in order to detect malicious activity by updating attack trees cumulatively. The processes of FIGS. 8A, 8B and 8C, are, for example, performed contemporaneously, automatically and in real time.

Turning to FIG. 8A, there is shown a flow diagram of a process performed to handle received attach trees and augment the present tree to continuously update the attack tree so as be able to identify all presently known malicious vertices. At block 802, a first or initial generalized attack tree (Tx$_i$), similar to generalized attack tree 300', calculated and produced in accordance with the process detailed above, and shown as an example in FIG. 9A (Tree 900), is received at the central location, e.g., server 702, from a node, e.g., computer 704a-704n (for example, computer/node B 704b, serving as computer/node X for this explanation only.) This generalized attack tree (Tx$_i$) is typically received via an upload from the client computer 704a-704n (e.g., computer B 704b). This generalized attack tree (Tx$_i$) is stored in storage media associated with the server 702.

The generalized attack tree (Tx$_i$) is formed, as detailed above, and summarized in FIG. 8B. The process of FIG. 8B, for explanation purposes only, is performed in computer/node B 704b, serving as computer/node X. Initially, at block 821 a trigger, for example, external or internal to the system, the trigger such as Check Point Anti-Bot (From Check Point Software Technologies Ltd.) detected communication to a malicious site, or a subtree representing a known malware, occurs. This trigger initiates the creation of the attack tree, that is calculated by the computer/node 704a-704n, as detailed in blocks 402-454. The attack tree is produced by the computer/node 704a-704n, at block 823 (as per blocks 402-454, detailed above). The now generalized attack tree is uploaded from the computer/node (X) 704a-704n, that calculated and produced it, to the central location (e.g., server 702), at block 824, where it is received (in the server 702) at block 802.

The process moves to block 804, where the received generalized attack tree (Tx$_i$) is divided into subtrees. This is shown for example in FIG. 9A, where the attack tree (Tx$_i$) 900, is divided into subtrees of links and vertices broken into subtrees 950, 960, 970. The subtrees 950, 960, 970 are the minimal units which will allow for the detection of malicious behavior without false positives.

The process moves to block 806, where the system of the central location server 702 responds to polls of other machines, for example, one or more of computers 704a-704n, of the network 700, which have new attack trees or subtrees. The system of the server 702 then analyzes whether there are attack trees and/or subtrees or parts of the subtrees exist in the trees of the polling machine(s), at block 808. If no, the process moves to block 810a, where a new attack tree (the tree which was divided into subtrees) is created. This newly created attack tree is moved (pushed) to a central location (for storage associated therewith), at block 810b, and the process moves to block 814.

Returning to block 808, if subtrees or parts thereof exist and match those corresponding subtrees or parts thereof from the polling machine (e.g., computer 704a-704n), the process moves to block 812a. At block 812a, as a prerequisite a subsequent attack tree which corresponds to the subtrees or pars that match the subtrees at block 808 is obtained by the process of FIG. 8C.

The process of FIG. 8C, for explanation purposes only, is performed in computer/node C 704c, serving as computer/node X. The machine (e.g., computer/node 704a-704n) which has the subtrees or parts thereof polls the central location 702, at block 830. This poll is received and responded to at block 806. It is then determined, at block 834, whether an attack tree or subtree, or parts therof, is found in the machine (e.g., 704a-704n) polling the central location 702. If no, at block 832, the process moves to block 834, where it ends. If yes, at block 832, the process moves to block 836, where, the full attack tree or subtree is calculated and built, on the polling computer/node 704a-704n. The calculated attack tree or subtree is then uploaded to the central location, from the computer/node 704a-704n, at block 838. The process resumes from block 812a.

Figure 9A:
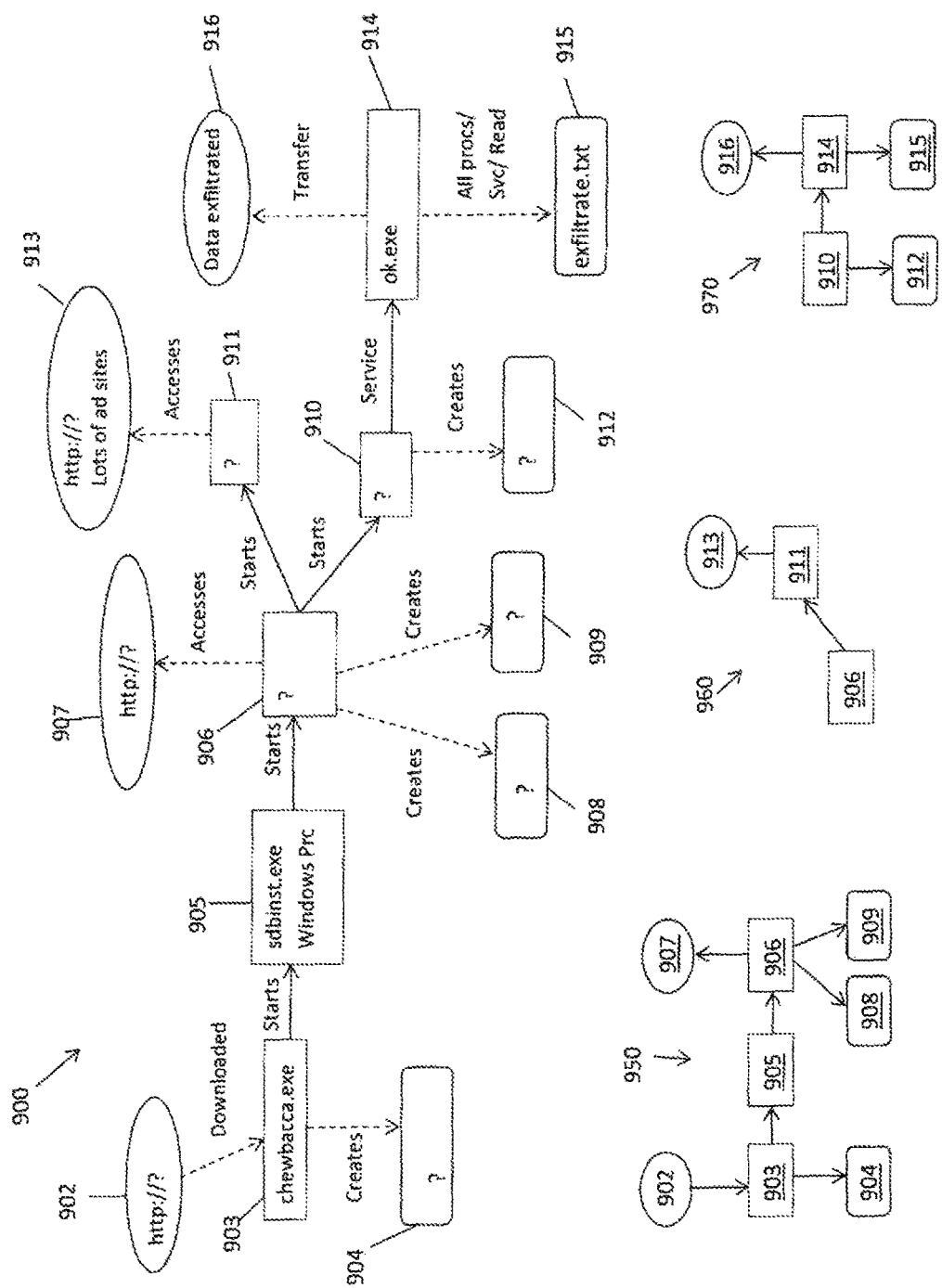
FIG. 9A is a diagram showing an attack tree and subtrees created therefrom.
Figure 9B:
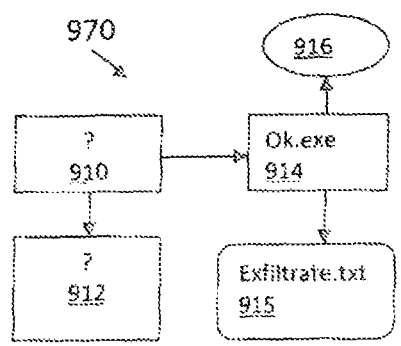
Figure 1:
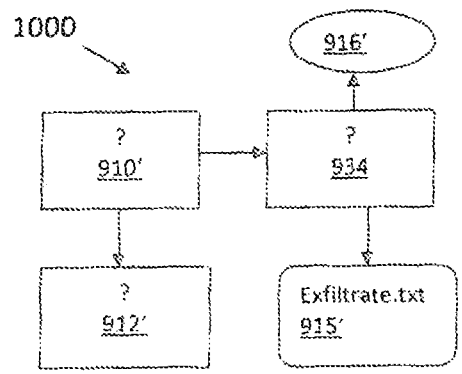
Figures 2, 9B:
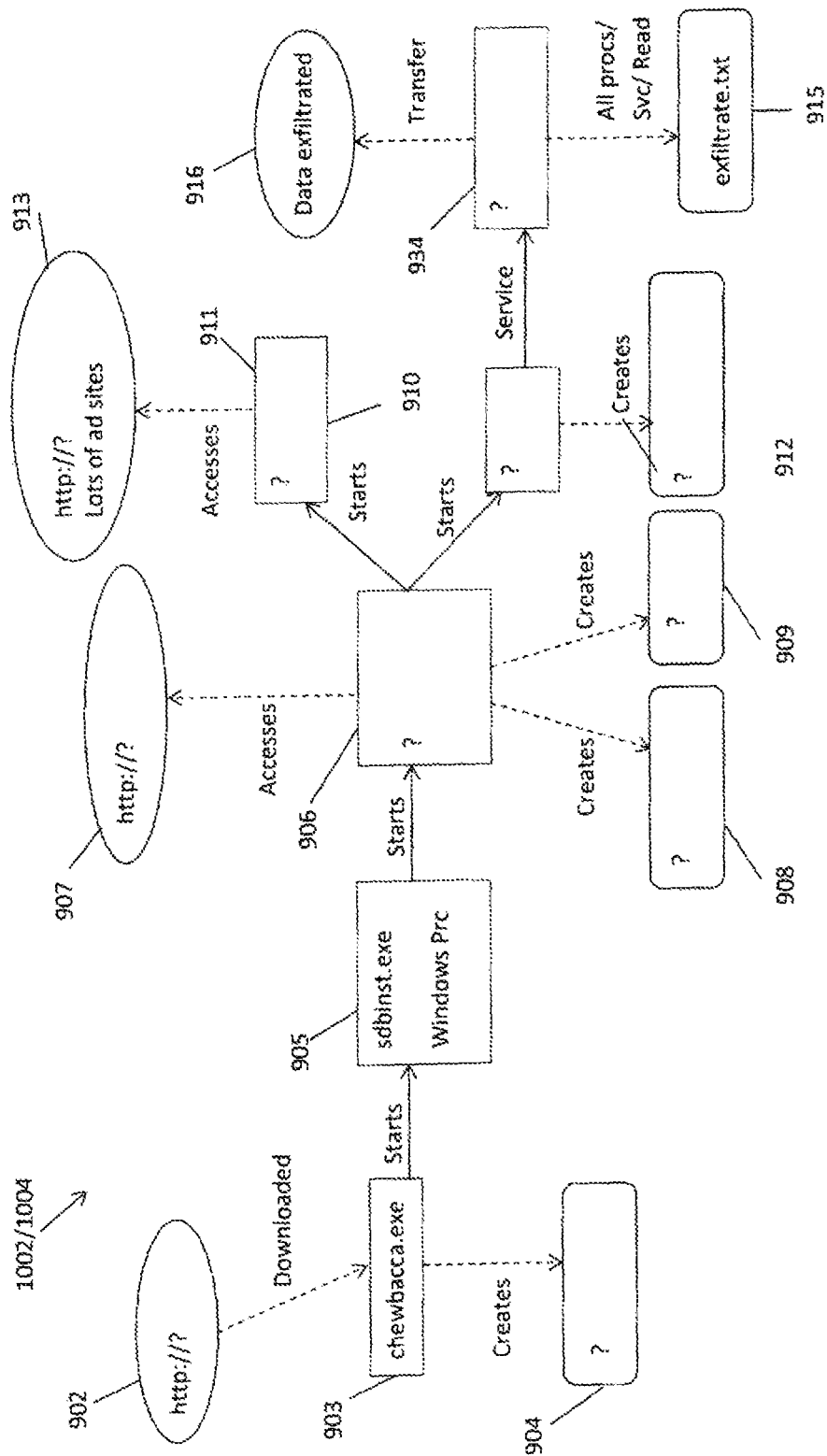

At block 812a, the attack tree from the polling machine is now received at the central location 702, where it is added to the initial (Tx$_i$) or stored (T) attack tree to create an updated or augmented attack tree (T). For example, as shown in FIG. 9B-1 a subtree 970 is shown. At block 808, it was found that subtree 970 of attack tree 900, matched portions of subtree 1000 from the polling machine. Attack tree 1002, shown in FIG. 9B-2, was built at block 836, from the subtree 1000. Attack tree 1002 differs from attack tree 900 in that it adds generalized block 934, with the added attack trees 900 and 1002, resulting in attack tree (T) 1004, of FIG. 9B-2. This updated or augmented attack tree (T), e.g., attack tree 1004, is moved (pushed) to the central location 702, at block 812*b*, and the process moves to block 814.

At block 814, the central location 702 stores and includes stored attack trees (T), as well as these attack trees broken into subtrees and other portions. Using the stored attack tree (T), the process moves to block 806 from where it repeats as detailed above. The processes of FIGS. 8A-8C may operate for as long as is necessary.

Method for Creating Automatic Remediation Tools

The normalized attack tree will allow for the finding of other infected systems in the network that have not yet been detected, as the attack is in its early or latent stages, as well as different instances of versions of the same attack.

This knowledge allows for the creation and development of remediation tools for specific attacks that do not compromise the legitimate system and user data.

Two types of remediation tools are created:
1. For target machines that contain software, for example, a recording agent, such as the agent and sensors disclosed in commonly owned U.S. patent application Ser. No. 14/963,265, entitled: Method and System for Determining Initial Execution of an Attack.
   Search for the exact generalized attack tree, (including vertices and links) or part of it, following a predefined algorithm that determines the minimal parts required to understand that the machine is infected and needs to be remediated, without compromising the legitimate system and user data, and without false positives risk.
   Having identified the infected machine, the attack tree is again denormalized, replacing the generalized data with specific artifacts on the machine.
   Denormalized list of vertices are listed and resolved according to their type:
   Keep the non-malicious (known good) parts of the attack untouched, without risking of causing damage to the system.
   Specific cleanup of all system from all the malicious artifacts installed in it by the attack, for example,
   Stop malicious process from running
   Delete/quarantine malicious file
   Revert changes to the registry
   Remove kernel objects created by the attack
   The normalized tree will be uploaded to central management tools.
   The remediation actions to make will be distributed across the machines in the network using our centralized management distribution tools.
   The remediation software already existing in each end point machine will take care of the actual execution.
2. For target machines that do contain software, for example, a recording agent, such as the agent and sensors, as disclosed in commonly owned U.S. patent application Ser. No. 14/963,265, entitled: Method and System for Determining Initial Execution of an Attack. In this case, the links in the graph cannot be searched and historical data is not present.
   The accuracy and false positive risk will be lower than in the previous case.
   A generalized list of all the normalized and not-normalized (known) vertices in the tree is created.
   An automatic script that can be run by external script executing tools (powershell, command line, etc.) that contains the relevant remediation action for the every node based on its type, is created as follows:
   Process: Attempt to kill it and delete the file. If killing fails, mark the process file for deletion on next reboot, and trigger a reboot at the end of the remediation script
   Files or other objects: Try to delete the file. If deletion fails, mark the file for deletion on next reboot, and trigger a reboot at the end of the remediation script
   Registry keys: If the registry key or value is completely owned by the malware (it didn't exist before and is not used by other application), delete it. Otherwise check if we have enough constant information to revert to the original value. If not, do not take any further action.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media. described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While embodiments of the disclosed subject matter have been described, so as to enable one of skill in the art to practice the present disclosed subject matter, the preceding description is intended to be exemplary only. It should not be used to limit the scope of the disclosed subject matter, which should be determined by reference to the following claims.

The invention claimed is:

1. A method for detecting potential malware comprising:
  a) 1) obtaining an attack tree representative of an attack on a network, the attack tree formed of objects;
   2) analyzing the objects to determine whether each of the objects is classified as known or unknown, in accordance with predefined criteria; and,
   3) representing the unknown objects in the attack tree as generalized objects, resulting in the creation of a first generalized attack tree from the obtained attack tree;
  b) dividing the first generalized attack tree into subtrees including first generalized objects;
  c) obtaining at least one subtree including second generalized objects associated with a subsequent generalized attack tree;
  d) comparing at least one of the subtrees from the first generalized attack tree to the at least one subtree associated with the subsequent generalized attack tree, based on at least partial matches of the first generalized objects and the second generalized objects, the least partial matches including matching less than all of the first generalized objects with the second generalized objects; and, e) augmenting the first generalized attack tree by adding the second generalized objects, which do not match the first generalized objects, to the first generalized attack tree, to detect potentially unknown malware.

2. The method of claim 1, wherein the objects include links and vertices.

3. The method of claim 2, wherein the links are determined to be known.

4. The method of claim 2, wherein each of the vertices is determined to be known, unless the object type of the vertice is determined as unknown when: a) the object type is unknown in accordance with a score; or, b) the object type is known and malicious in accordance with a score.

5. The method of claim 4, wherein the object type includes at least one of: a uniform resource locator (URL), a file, a process, or a registry key.

6. The method of claim 2, wherein the least partial matches includes matching all of the first generalized objects with the second generalized objects.

7. The method of claim 4, wherein the score includes at least one of: a field score, a numeric score, and an overall score based on the sum of: 1) field scores, and, 2) numeric scores.

8. The method of claim 1, wherein the attack on the network occurs in at least one machine linked to the network.

9. The method of claim 1, wherein the attack on the network occurs at an endpoint of the network.

* * * * *